3,000,781
Patented Sept. 19, 1961

3,000,781
FLUORINE - CONTAINING OCTAHALOGENOUS
ENDOMETHYLENE - TETRAHYDROPHTHAL-
ANES
Hans Feichtinger, Duisburg-Beeck, and Hans-Werner
Linden, Moers, Germany, assignors to Ruhrchemie Ak-
tiengesellschaft, Oberhausen-Holten, Germany, a Ger-
man corporation
No Drawing. Filed July 14, 1959, Ser. No. 826,901
Claims priority, application Germany Jan. 7, 1956
11 Claims. (Cl. 167—33)

This invention relates to and has as its object the pro-
duction of novel fluorinated octahalogen-tetra-hydroph-
thalane compounds.

This application is a continuation-in-part of our co-
pending applications Serial Nos. 632,943 and 637,639,
filed January 7, 1957 and February 1, 1957, respectively,
now abandoned.

The novel fluorinated octahalogen-endomethylene-tetra-
hydrophthalanes in accordance with the invention have
the general formula:

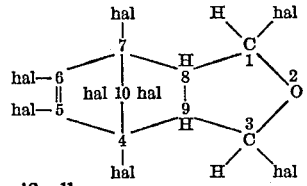

and more specifically:

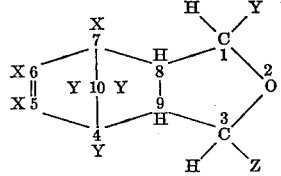

in which X represents chlorine, at least one of the Y's
and Z's represents fluorine, each of the other Y's and Z's
is a member selected from the group consisting of chlo-
rine and fluorine, said compounds containing from 1 to
4 fluorine atoms and from 4 to 7 chlorine atoms, but
always containing identical substituents at position 10,
and at positions 4 and 5 i.e. either two chlorine or two
fluorine atoms.

The preferred novel fluorinated tetrahydrophthalanes
in accordance with the invention are:

(1) 1-fluoro-3,4,5,6,7,10,10-heptachloro-4,7-methylene-4,
7,8,9-tetrahydrophthalane.
(2) 1,3 - difluoro-4,5,6,7,10,10-hexachloro-4,7-methylene-
4,7,8,9-tetrahydrophthalane.
(3) 10,10 - difluoro-1,3,4,5,6,7-hexachloro-4,7-methylene-
4,7,8,9-tetrahydrophthalane.
(4) 1,10,10-trifluoro-3,4,5,6,7-pentachloro-4,7-methylene-
4,7,8,9-tetrahydrophthalane.
(5) 1,3,10,10 - tetrafluoro-4,5,6,7-tetrachloro-4,7-methyl-
ene-4,7,8,9-tetrahydrophthalane.
(6) 4,5,10,10 - tetrafluoro-1,3,6,7-tetrachloro-4,7-methyl-
ene-4,7,8,9-tetrahydrophthalane.

The last compound 4,5,10,10-tetrafluoro-1,3,6,7-tetra-
chloro-4,7-methylene-4,7,8,9-tetrahydrophthalane is equiv-
alent to a 6,7,10,10-tetrafluoro configuration, for the rea-
son that positions 4 and 5 are equivalent to positions 6
and 7 in a compound of this structure.

The novel compounds, in accordance with the inven-
tion, may be obtained by different methods, depending
whether the fluorine atom or atoms are in the 1 and 3
positions, also called α and α' position, or in the 10,10-
position and in the 4,5-position, that is depending whether
the final product is an α,α'-fluorinated ether, or contains
the fluorine atoms in the bicycloheptene moiety of the
molecule. Of course, the fluorine atoms may also be
present in both moieties of the molecule, the bicyclohep-
tene moiety as well as the oxygenated moiety. The com-
pounds containing fluorine in the 1 or in both 1 and 3
positions, i.e. the α and α'-fluorinated compounds, may
be obtained by reacting a 1,3-dichloro-4,5,6,7,10,10-hex-
ahalogen-4,7-methylene-4,7,8,9-tetrahydrophthalane with
liquid hydrogen fluoride, according to the following reac-
tion scheme:

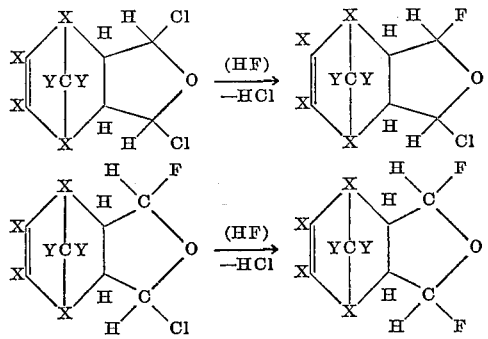

It is understood that all of the X's in the formulae rep-
resent chlorine atoms, each of the Y's is a member of the
group consisting of chlorine and fluorine atoms, and that
the two substituents in position 10 are identical, i.e., they
are either both chlorine or both fluorine atoms. The
starting materials 1,3-dichloro-endomethylene-tetrahydro-
phthalanes may be obtained by the addition of hexahalo-
cyclopentadiene to 2,5-dihydrofurane and subsequent
chlorination. Thus, for example, in order to obtain start-
ing material 1,3,4,5,6,7,10,10-octachloro-4,7-methylene-
4,7,8,9-tetrahydrophthalane, 2,5-dihydrofurane is added
to hexachlorocyclopentadiene and the addition product is
subsequently chlorinated.

The process in accordance with the invention may be
effected in a very simple manner by heating the 1,3,4,5,
6,7,10,10-octahalogen - 4,7 - methylene-4,7,8,9-tetrahydro-
phthalane, which is chlorinated in the 1 and 3-positions
with an excess of anhydrous hydrogen fluoride in a closed
vessel, which is resistant to hydrogen fluoride and hydro-
gen chloride. The heating may be effected at tempera-
tures between about 50 and 150° C., and preferably be-
tween about 100° and 120° C., though temperatures ex-
ceeding this range may also be used. The use of higher
temperatures is, however, undesirable, as the same results
in side reactions which detrimentally influence the re-
covery of the desired fluorinated endomethylene-tetrahy-
drophthalanes. During the reaction, the hydrogen chlo-
ride set free by the exchange reaction causes a slow rise
in the pressure to which the reaction vessels must be
structurally adapted by a suitable choice of dimensions
of wall thickness. When using temperatures in the me-
dium temperature range, reaction times of 2 to 40 hours
and generally 10 to 24 hours should be used. With
the use of small amounts of catalysts, as, for example,
0.1 to 10%, and preferably 0.1 to 2% of silver fluoride,
antimony trifluoride or antimony trichloride, the reac-
tion time may be substantially reduced and higher yields of higher purity products obtained. Upon the termination of the reaction and cooling of the reaction vessel, the hydrogen chloride formed is depressurized. The excess hydrogen fluoride, which has not been converted in the reaction, may be separated by fractional condensation. The remaining reaction product is repeatedly washed with water to remove any adhering hydrogen fluoride, and then dried. A further purification may be achieved by re-crystallization from gasoline or alcohol with, for example, the addition of a decolorizing agent.

The compounds obtained in accordance with the invention are of a brownish color, and when, for example, the octachloro compound is used, the product consists of 60% of 1-fluoro-3,4,5,6,7,10,10-heptachloro-4,7-methylene-4,7,8,9-tetrahydrophthalane (melting point 103–105° C.) and 35% of 1,3-difluoro-4,5,6,7,10,10-hexachloro-4,7-methylene-4,7,8,9-tetrahydrophthalane (melting point 182–183° C.). The by-products obtained in the reaction comprise small amounts of oily substances of unknown constitution in addition to unconverted starting materials. By means of chromatography the 1-fluoro- and the 1,3-difluoro-compound may be isolated out of the reaction mixture.

It is known that hydrogen fluoride reacts with many organic compounds effecting re-arrangements, condensations or polymerisations (see e.g. J. H. Simons, Fluorine Chemistry, vol. 1 (1950), pages 261–292). The conversion in accordance with the invention of the octahalogenated endomethylene tetrahydrophthalane ring system is completely unexpected. The normally expected condensation reactions only occur to a very small extent, and the ring system remains completely intact.

The process in accordance with the invention is very economical as compared with the prior known fluorinating reactions using antimony fluorides, since the excess hydrogen fluoride used in accordance with the invention can, by very simple fractionation at normal atmospheric pressure, be separated from the hydrogen chloride split off. The exchange of chlorine with fluorine by means of hydrogen fluoride is very economical in view of the high fluorine content of hydrogen fluoride.

If 1-fluoro-3,4,5,6,7,10,10-heptachloro-4,7-methylene-4,7,8,9-tetrahydrophthalane or 1,10,10-trifluoro-3,4,5,6,7-pentachloro-4,7-methylene - 4,7,8,9 - tetrahydrophthalane are to be obtained in pure state, this may also be achieved by first converting 4,5,6,7,10,10-hexachloro-4,7-methylene-4,7,8,9-tetrahydrophthalane or 10,10-difluoro-4,5,6,7-tetrachloro-4,7-methylene - 4,7,8,9 - tetrahydrophthalane, respectively into 3,4,5,6,7,10,10-hexachloro-1-bromo-4,7-methylene-4,7,8,9-tetrahydrophthalane or 10,10-difluoro-4,5,6,7-tetrachloro-1-bromo-4,7-methylene - 4,7,8,9 - tetrahydrophthalane, respectively. This bromination may be easily carried out in conventional manner by adding bromine dropwise to the previously dissolved starting material. Then the bromine derivative is dissolved in a suitable organic solvent, particularly acetonitrile. This solution is treated at boiling temperature with heavy metal fluorides, particularly with silver fluoride or mercuric fluoride. Upon cooling, there are formed white crystals which can be purified by recrystallization from petroleum ether. This results in good yields of 1-fluoro-4,5,6,7,10, 10 - hexachloro-4,7-methylene-4,7,8,9-tetrahydrophthalane or 1,10,10-trifluoro-4,5,6,7-tetrachloro-4,7-methylene-4,7, 8,9-tetrahydrophthalane, respectively. The following reaction scheme shows the production of these compounds:

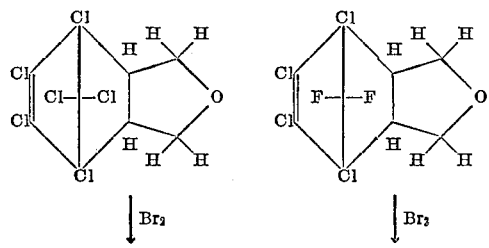

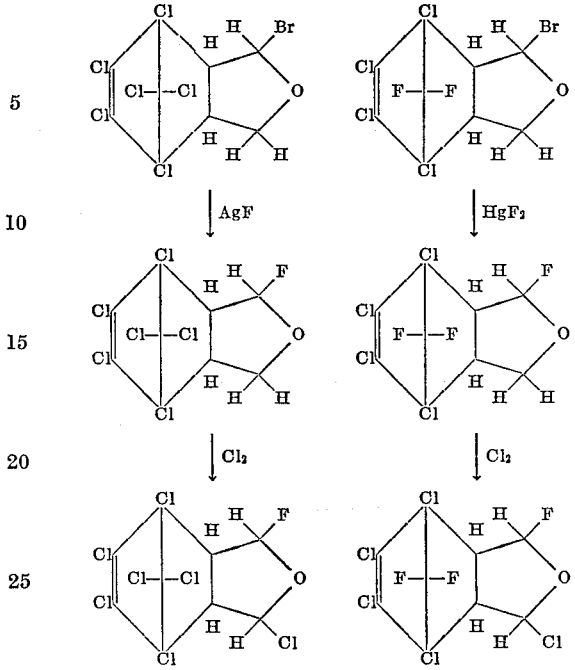

The 1-fluoro- and the 1,10,10-trifluoro-compounds are suitable starting materials for a chlorination on the carbon atom 3 of the molecule.

For the preparation of compounds containing fluorine atoms in positions 4, 5 and 10, in accordance with the invention, a hexahalogenated endomethylene-tetrahydrophthalane, containing up to a maximum of four fluorine atoms, located at positions 4, 5 and 10, but with two identical substituents at position 10, i.e. either two chlorine or two fluorine atoms, is chlorinated, in accordance with the following reaction scheme:

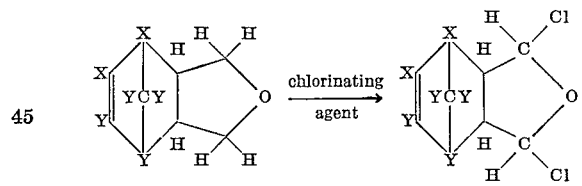

It is understood that all of the X in the formulas represent chlorine atoms, and each of the Y is a member of the group consisting of chlorine and fluorine, and that the two Y in position 10 are identical atoms, that is, either both chlorine or both fluorine atoms.

The chlorination may be effected in any conventional manner, which will result in a chlorine substitution in the tetrahydrofurane ring portion of the endomethylene-tetrahydrophthalane. Chlorination products of optimum efficiency, as obtained when 2 chlorine atoms are introduced per molecule of starting material into the tetrahydrofurane-ring portion of the molecule. Chlorination may be effected, for example, in the conventional manner, by introducing gaseous chlorine into a boiling solution of the hexahalogenated phthalane and carbon tetrachloride, or another suitable solvent. It is also possible to use as chlorinating agents compounds from which chlorine can be readily split off, as, for example, sulfuryl chloride or chlorosuccinimide.

It is also possible to effect chlorination in the absence of a solvent, as, for example, by directly contacting the hexahalogenphthalane with gaseous chlorine or a suitable chlorinating agent, and, if desired, a chlorine transfer agent as, for example, aluminum trichloride. The reaction may be effected at room temperature, but may be aided by the use of heat, actinic light, or suitable catalytic additions. Chlorination may be effected continuously or discontinuously in glass vessels or enamelled metal devices. Depending upon the working conditions, the amount of chlorine absorbed may be determined gravimetrically or by sampling from the reaction vessel with a determination of the chlorine content. The reaction may be considered as being complete when the halogenation degree desired is reached. This amounts to two gram-atoms of chlorine per one gram mol of starting material plus the amount of halogen already contained therein.

It is noted that the chlorination reaction does not involve an exchange for chlorine of the fluorine contained in the bicycloheptene portion of the phthalane molecule. Thus, for example, when chlorinating 10,10-difluoro-4,5,6,7 - tetrachloro - 4,7 - methylene - 4,7,8,9 - tetrahydrophthalane, 10,10-difluoro-1,3,4,5,6,7-hexachloro-4,7-methylene-4,7,8,9-tetrahydrophthalane is obtained in a yield which amounts to about 85% of the theoretical yield. This reaction may be represented as follows:

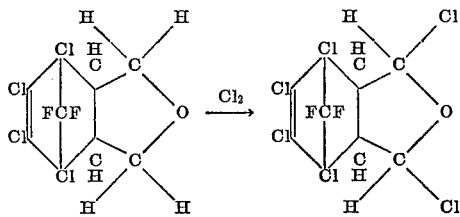

The reaction products obtained in accordance with the invention are in general white crystalline compounds. The 10,10 - difluoro - 1,3,4,5,6,7 - hexachloro - 4,7-methylene-4,7,8,9-tetrahydrophthalane has a corrected melting point of about 91° C. It is readily soluble in the usual organic solvents, such as alcohols, ethers, ketones, esters, or hydrocarbons, but is practically insoluble in water. The compound is stable in the presence of the atmosphere and in the presence of water.

The starting materials for producing the compounds in accordance with the invention are known, and constitute all the hexahalogenated endomethylene-tetrahydrophthalanes which contain fluorine and chlorine in the bicycloheptene portion of the molecule. These starting materials may be obtained in the known manner by the Diels-Alder addition of 2,5-dihydrofurane and hexahalogenated cyclopentadienes. The starting materials may, for example, be prepared by the method described in Dutch Patent 83,106.

The compounds in accordance with the invention show a high initial insecticidal effect and have proven surprisingly superior to, for example, Aldrine, Dieldrine or Chlordane. When using fluorine-containing compounds in accordance with the invention, it is much easier to obtain a 100% mortality of the insects contacted with a lower concentration. The insecticides known under the trade-names of "Chlordane" and "Heptachlor" are chlorination products of the addition compounds from hexachlorocyclopentadiene and cyclopentadiene. The insecticide known under the trade-name of "Aldrine" is an addition compound from hexachlorocyclopentadiene and bicycloheptadiene while "Dieldrine" is the trade-name of the epoxy compound of Aldrine.

The new compounds can be utilized as an insect toxicant in all the ways customary in the art. Thus they can be dissolved in the insecticide base oils normally employed and the resulting solutions sprayed or otherwise employed in the usual fashion. They can also be combined with finely divided carriers to produce both wettable and non-wettable insecticidal dusts and they can be used together with emulsifying agents, with water, and with water and oil to form insecticidal emulsions. They can also be incorporated in aerosol compositions, and, in general, they can be used either as the sole insect toxicant in an insecticidal composition or in combination properties and other desirable characteristics. Moreover, the new compounds can be incorporated in paints and other surface coatings in order to impart insecticidal characteristics to the surface finishes, they can be incorporated into waxes and wax emulsions in order that the surfaces treated with these materials may be made insecticidal, they can be incorporated into paper and into cardboard, into inks, into plasticizers, into plastic sheets, etc. in order that desirable insecticidal characteristics can be acquired either directly by these materials or by the materials with which they are used.

It will be apparent to those skilled in the art that the new compounds will have many uses other than those already enumerated. Thus, for example, they may have value as a plasticizer in many types of resinous and polymer compositions. These compositions are also valuable as fungicides and other organic compounds useful in the arts and sciences.

The fluorinated and chlorinated endomethylene-tetraphthalane compounds formed in accordance with the invention are not combustible, and when added in small amounts to combustible material, such as low-boiling hydrocarbons, the flash point of the latter is considerably increased. The compounds in accordance with the invention may therefore also be used for this purpose.

The following examples are given by way of illustration and not limitation of the invention.

EXAMPLE 1

In a pressure-resistant tube of acid-proof steel of 700 mm. length and 18 mm. inside diameter, 30 cc. of anhydrous hydrogen fluoride were poured over 20 grams (0.048 mol) of 1,3,4,5,6,7,10,10-octachloro-4,7-methylene-4,7,8,9-tetrahydrophthalene while cooling the outside surface of the tube with ice. After closing the tube with a screw cap packed with copper, the closed tube was heated for 10 hours at 100° C. in an electrically heated furnace. After allowing the tube to cool and then cooling in liquid nitrogen for the purpose of condensing the hydrogen chloride formed during the reaction, the tube was opened and the reaction product brought to room temperature. In doing so, the hydrogen chloride and a small part of the excess hydrogen fluoride escaped. Water was repeatedly poured over the solid residue and decanted each time. After an approximately neutral reaction of the washing water, the brown, solid reaction product was squeezed on a clay dish and recrystallized from 30 cc. of ethanol with the oily constituents remaining in the solvent. This resulted in 15.6 grams of a pale yellow-colored crystallizate having a melting point of 109–115° C.

Processing of the reaction mixtures obtained was effected by means of downward flow chromatography. The adsorbent used was alumina prepared as prescribed by Brockmann. Elution was effected with petroleum ether having a boiling range of 30–60° C.

A glass tube of 120 cm. in length and 25 mm. internal diameter, heated to 15° C. and provided with a glass frit used in at its lower end was filled up to a height of 100 cm. with alumina suspended in petroleum ether. Then 5 grams of the reaction mixture were dissolved in 25–100 ccm. of petroleum ether and this solution was added on top of the alumina column. Thereafter, a continuous stream of petroleum ether was allowed to pass through the column and the refractive index of the effluent eluates was determined. Eluate fractions having approximately the same refractive index were combined to main fractions from which the solvent was removed by evaporation. The residue was weighed. The resides obtained could be identified by determination of the melting points, thermal analyses and elementary analyses. It was found that oily polycondensates of unknown structure flowed off first from the alumina column. These were followed by unconverted starting material and, finally, by 1-fluoro-3,4,5,6,7,10,10-heptachloro-4,7-methylene-4,7,8,9-tetrahydrophthalane and thereafter by 1,3-difluoro-4,5,6,7,10,10-hexachloro-4,7-methylene-4,7,8,9-tetrahydrophthalane.

By application of this chromatographic techniques the material was found to consist of 45% by weight of 1-fluoro-3,4,5,6,7,10,10-heptachloro-4,7-methylene-4,7,8,9-tetrahydrophthalane and 25% by weight of 1,3-difluoro-4,5,6,7,10,10-hexachloro-4,7-methylene-4,7,8,9-tetrahydrophthalane. The balance included unconverted starting material and small amounts of oily constituents.

*1-fluoro-3,4,5,6,7,10,10-heptachloro-4,7-methylene-4,7,8,9-tetrahydrophthalane*

[Formula: $C_9H_4OFCl_7$ Molecular weight: (395.24). Melting point: 103°–105° C.]

|   | Calculated, percent | Found, percent |
|---|---|---|
| C | 27.35 | 27.28 |
| H | 1.02 | 1.00 |
| F | 4.81 | 4.80 |
| Cl | 62.78 | 63.01 |

*1,3-difluoro-4,5,6,7,10,10-hexachloro-4,7-methylene-4,7,8,9-tetrahydrophthalane*

[Formula: $C_9H_4OF_2Cl_6$. Molecular weight: 378.86. Melting point: 182°–183° C.]

|   | Calculated, percent | Found, percent |
|---|---|---|
| C | 28.53 | 28.86 |
| H | 1.06 | 1.12 |
| F | 10.03 | 10.12 |
| Cl | 56.15 | 56.19 |

EXAMPLE 2

34.3 grams (0.10 mol) of 4,5,6,7,10,10-hexachloro-4,7-methylene-4,7,8,9-tetrahydrophthalane were displaced into a three-necked flask provided with stirrer, reflux condenser and dropping funnel and dissolved in 250 cc. of carbon tetrachloride. The solution was heated to boiling and 16 grams (0.10 mol) of bromine were slowly added in drops while irradiating with ultraviolet light (80 w. lamp). Hydrogen bromide escaped almost instantaneously. The addition of bromine was terminated after about 1 hour. The solvent was then removed under vacuum at a temperature of the water bath of not more than 60° C. Then 50 cc. of petroleum ether were added and the reaction mixture was allowed to stand overnight in an ice box. After filtration with suction and rewashing with little ice-cold petroleum ether, 38.8 grams of 1-bromo-4,5,6,7,10,10-hexachloro-4,7-endomethylene-4,7,8,9-tetrahydrophthalane having a melting point of 74–75° C. were obtained.

26.5 grams (0.063 mol) of this 1-bromo-4,5,6,7,10,10-hexachloro-4,7-endomethylene-4,7,8,9-tetrahydrophthalane were treated with 50 cc. of acetonitrile and mixed with 25.4 grams of a $CaF_2$ carrier containing 50% of AgF (0.10 mol of AgF). This mixture was maintained vigorously boiling for 8 hours while stirring. Upon termination of the reaction, the mixture was filtered and the acetonitrile was distilled off under vacuum. This resulted in a brown residue which was extracted with petroleum ether. The filtrate was treated with active charcoal, filtered and evaporated to about 30 cc. Upon cooling on ice, fine white crystals were obtained which, after suction filtration and repeated recrystallization from petroleum ether, had a melting point of 212–213° C. The yield of 1-fluoro-4,5,6,7,10,10-hexachloro-4,7-endomethylene-4,7,8,9-tetrahydrophthalane was 19.3 grams.

[Formula: $C_9H_5OCl_6F$. Molecular weight: 360.87]

|   | Calculated, percent | Found, percent |
|---|---|---|
| C | 29.95 | 30.08 |
| H | 1.40 | 1.44 |
| Cl | 58.95 | 59.14 |
| F | 5.27 | 5.32 |

7.2 grams (0.02 mol) of the 1-fluoro-4,5,6,7,10,10-hexachlor-4,7-endomethylene-4,7,8,9-tetrahydrophthalane obtained were dissolved in 30 cc. of carbon tetrachloride and treated with 1.0 liter of gaseous chlorine at boiling heat while irradiating with ultraviolet light. Upon evaporation of the solvent and recrystallization for three times from ethanol, 7.25 grams of 1-fluoro-3,4,5,6,7,10,10-heptachloro-4,7-endomethylene-4,7,8,9-tetrahydrophthalane melting at 103° C. were obtained.

[Formula: $C_9H_4OFCl_7$. Molecular weight: 395.24]

|   | Calculated, percent | Found, percent |
|---|---|---|
| C | 27.35 | 27.28 |
| H | 1.02 | 1.00 |
| Cl | 62.78 | 63.01 |

EXAMPLE 3

In accordance with Example 1, 20 grams (0.048 mol) of 1,3,4,5,6,7,10,10-octachloro-4,7-methylene-4,7,8,9-tetrahydrophthalane were reacted with 100 cc. of liquid hydrogen fluoride for 40 hours at 100° C. By means of the processing method described in Example 1, 7.5 grams of a slightly yellowish colored reaction product having a fluorine content of 7.0% was obtained. This product comprised 7.5% of starting material, 39.0% of 1-fluoro-3,4,5,6,7,10,10-heptachloro-4,7-methylene-4,7,8,9-tetrahydrophthalane and 47% of 1,3-difluoro-4,5,6,7,10,10-hexachloro-4,7-methylene-4,7,8,9-tetrahydrophthalane. The balance consisted of oily products of unknown composition.

EXAMPLE 4

In accordance with Example 1, 150 grams (0.36 mol) of 1,3,4,5,6,7,10,10-octachloro-4,7-methylene-4,7,8,9-tetrahydrophthalane and about 300 cc. of liquid hydrogen fluoride, in a shaking autoclave, were first heated for 20 hours at 100° C. and then for another 9 hours at 120° C. This resulted in the formation of 138 grams of a brown-colored reaction product which was dissolved in methanol and treated with decolorizing agents. Upon filtration of the hot solution with the addition of some water, 97 grams of a yellowish-colored mixture of 60% 1-fluoro-3,4,5,6,7,10,10-heptachloro-4,7-methylene-4,7,8,9-tetrahydrophthalane and 35% 1,3-difluoro-4,5,6,7,10,10-hexachloro-4,7-methylene-4,7,8,9-tetrahydrophthalane was obtained. The starting material was practically completely converted in this reaction.

EXAMPLE 5

In accordance with Example 1, 150 grams (0.36 mol) of 1,3,4,5,6,7,10,10-octachloro-4,7-methylene-4,7,8,9-tetrahydrophthalane were mixed with 300 cc. of liquid hydrogen fluoride and 1.5 grams of antimony trifluoride were added to the mixture. This was followed by heating for 20 hours at 100° C. in a shaking autoclave. Upon processing with methanol and decolorizing agents there resulted 118 grams of a yellowish-colored mixture consisting of 52% 1-fluoro-3,4,5,6,7,10,10-heptachloro-4,7-methylene-4,7,8,9-tetrahydrophthalane and 43% 1,3-difluoro-4,5,6,7,10,10-hexachloro-4,7-methylene - 4,7,8,9 - tetrahydrophthalane.

EXAMPLE 6.—DUSTING AGENT

A portion of the mixture of 1-fluoro-3,4,5,6,7,10,10-heptachloro-4,7-methylene - 4,7,8,9 - tetrahydrophthalane and 1,3-difluoro-4,5,6,7,10,10-hexachloro-4,7-methylene-4,7,8,9-tetrahydrophthalane prepared according to Example 3 was very finely ground was 197 parts of talc with the addition of a mixture of 1 part of heavy benzene and 1 part of fat alcohol-ethylene oxide condensation product. An effective insecticidal dusting agent was formed.

EXAMPLE 7.—EMULSION

Dissolution of 20 parts of the mixture of α- and α,α'-flourinated ethers prepared according to Example 4, and 5 parts of fat alcohol-ethylene oxide condensation product (Emulsifier G 2081 of Chemische Fabrik Goldschmidt, Essen, Germany) in 75 parts of xylene resulted in a concentrate, which, before use, could be stirred up with 2–5000 parts of water to form an insecticidal emulsion.

EXAMPLE 8.—SUSPENSION 40 parts of the mixture of α- and α,α'-fluorinated ethers prepared according to Example 4 were ground to extreme fineness with 10 parts of Emulsifier GA 6590 (Goldschmidt) and 50 parts of kaolin. Before use, 1 part of this mixture was stirred up in 5000 parts of water to form an insecticidal suspension.

EXAMPLE 9.—SPRAY

A portion of the mixture of α- and α,α'-fluorinated ethers prepared according to Example 4 was dissolved in 99 parts of kerosene to form an insecticide spray.

EXAMPLE 10

At first, 46.8 grams (0.19 mol) of 5,5-difluoro-1,2,3,4-tetrachloro-cyclopentadiene (boiling point at 5 mm. Hg 46–52° C., refractive index $n_D^{20}$, 1.4998) were heated with 28.0 grams (0.40 mol) of 2,5-dihydrofurane for 15 hours at 100° C. in a closed tube. The brown-colored reaction product was flushed out from the tube by means of petroleum ether and the excess dihydrofurane and the petroleum ether were distilled off. The brownish-colored oily residue, when mixed with 15 cc. of petroleum ether and allowed to stand for some time in an ice-box, resulted in a crystal slurry which was suction-filtered. Upon drying on clay, 55.2 grams (89% of the theory) of a brownish-colored crystallizate was obtained. Re-crystallization from petroleum ether with the addition of decolorizing agents resulted in needles having a melting point of 58–60° C.

This reaction product which was purified up to a melting point of 61–62° C. (corrected) had a pleasant camphor-like odor and was very well soluble in organic solvents most in use. It consisted of practically pure 10,10-difluoro - 4,5,6,7-tetrachloro - 4,7-methylene-4,7,8,9-tetrahydrophthalane.

[Formula: $C_9H_6OF_2Cl_4$. Molecular weight: 309.97]

|   | Calculated, percent | Found, percent |
| --- | --- | --- |
| C | 34.87 | 35.04 |
| H | 1.95 | 1.76 |
| F | 12.26 | 12.09 |
| Cl | 45.76 | 45.51 |

31.0 grams (0.10 mols) of the 10,10-difluoro-4,5,6,7-tetrachloro-4,7-methylene - 4,7,8,9 - tetrahydrophthalane (melting point 61–62° C.) were dissolved in 150 cc. of carbon tetrachloride and treated with 5.4 liters of chlorine within 4½ hours while boiling and irradiating with ultra-violet light (80 watt lamp at a distance of 5–6 cm. form the reaction vessel). The solvent was distilled off and the odorless, oily residue was stirred up with a little petroleum ether. This resulted in an almost instantaneous beginning of separation of a white crystal mass having an initial melting point of 73° C. and a halogen content of 10.3% of fluorine and 55.7% of chlorine.

The chlorination mixture thus obtained was recrystallized from petroleum ether. This resulted in 32.5 grams of 10,10 - difluoro-1,3,4,5,6,7-hexachloro-4,7-methylene-4,7,8,9-tetrahydrophthalane having a melting point of 86°–88° C. The corrected melting point of the analytically pure compound was 91° C.

[Formula: $C_9H_4OF_2Cl_6$. Molecular weight: 378.86]

|   | Calculated, percent | Found, percent |
| --- | --- | --- |
| C | 28.53 | 28.77 |
| H | 1.06 | 1.05 |
| F | 10.03 | 10.19 |
| Cl | 56.15 | 56.25 |

The yield amounted to 85% of the theoretically possible quantity.

EXAMPLE 11

In the manner described in Example 10, 10.3 grams (0.033 mol) of 10,10-difluoro-4,5,6,7-tetrachloro-4,7-methylene-4,7,8,9-tetrahydrophthalane dissolved in 30 cc. of carbon tetrachloride were treated with 2.7 liters of chlorine. After distilling off, there was obtained a reaction product, the halogen content of which was 9.7% of fluorine and 57.0% of chlorine. After a short time, 4.5 grams of 10,10-difluoro-1,3,4,5,6,7 hexachloro-4,7-methylene-4,7,8,9-tetrahydrophthalane separated from the chlorination mixtures.

EXAMPLE 12

In accordance with Example 10, 18.6 grams (0.06 mol) of 10,10-difluoro-4,5,6,7-tetrachloro-4,7-methylene-4,7,8,9-tetrahydrophthalane were dissolved in 50 cc. of carbon tetrachloride and treated with 12.2 liters of chlorine. After usual processing, there resulted 24.5 grams of a colorless oil which had a fluorine content of 9.2% and a chlorine content of 59.6%. The oil could be distilled under high vacuum and distilled over at a boiling point 112–122° C. The distillate had a refractive index, $n_D^{18}$, of 1.5492 and a content of about 10% of 10,10-difluoro-1,3,4,5,6,7-hexachloro-4,7-methylene - 4,7,8,9 - tetrahydrophthalane as shown by chromatographic analysis.

EXAMPLE 13

31.0 grams (0.10 mol) of 10,10-difluoro-4,5,6,7-tetrachloro-4,7-methylene-4,7,8,9-tetrahydrophthalane, 32.5 grams (0.22 mol) of sulfuryl chloride and 50 cc. of carbon tetrachloride were heated for 10 hours under a reflux condenser with the addition of 0.3 gram of benzoyl peroxide. After boiling down under vacuum, the residue was dissolved in ether, washed once with bicarbonate solution and once with water, and the ethereal layer was finally dried over anhydrous sodium sulfate. After having distilled off the ether, there resulted 35 grams (92% of the theoretical yield) of a yellow to brown-colored crystal mass which, after purification with petroleum ether and decolorizing agents, showed a melting point of 85–88° C.

EXAMPLE 14

In the manner described in Example 1, 20 grams (0.053 mol) of 10,10-difluoro-1,3,4,5,6,7-hexachloro-4,7-methylene-4,7,8,9-tetrahydrophthalane and 30 cc. of anhydrous hydrogen fluoride, in a pressure-resistant steel tube, were heated for 18 hours at 100° C. and for another 4 hours at 120° C. Processing in the manner set forth in Example 1 resulted in 17.8 grams of a brownish-colored reaction product having a melting point of 40–50° C. Upon recrystallization from petroleum ether there were obtained 14.7 grams of an almost white crystal mass having a melting point between 49° and 52° C. By means of chromatographic techniques the material was found to consist of about 57% 1,10,10-trifluoro-3,4,5,6,7-pentachloro-4,7-methylene - 4,7,8,9 - tetrahydrophthalane and 33% of 1,3,10,10-tetrafluoro-4,5,6,7-tetrachloro-4,7-methylene-4,7,8,9-tetrahydrophthalane. The balance contained 4–5% of the starting material charged and oily constituents of unknown nature.

*1,10,10-trifluoro - 3,4,5,6,7 - pentachloro-4,7-methylene-4,7,8,9-tetrahydrophthalane*

[Formula: $C_9H_4OF_3Cl_5$. Molecular weight: 362.41. Melting point: 56° C.]

|    | Calculated, percent | Found, percent |
|----|---------------------|----------------|
| C  | 29.83               | 30.05          |
| H  | 1.11                | 1.34           |
| F  | 15.73               | 15.48          |
| Cl | 48.92               | 48.98          |

*1,3,10,10-tetrafluoro - 4,5,6,7 - tetrachloro-4,7-methylene-4,7,8,9-tetrahydrophthalane*

[Formula: $C_9H_4OF_4Cl_4$. Molecular weight: 345.95. Melting point: 89° C.]

|    | Calculated, percent | Found, percent |
|----|---------------------|----------------|
| C  | 31.24               | 31.43          |
| H  | 1.16                | 1.28           |
| F  | 21.97               | 21.59          |
| Cl | 41.00               | 41.03          |

EXAMPLE 15

In the manner described in Example 2, 31.0 grams (0.10 mol) of 10,10-difluoro-4,5,6,7-tetrachloro-4,7-methylene-4,7,8,9-tetrahydrophthalane were brominated in 150 cc. carbon tetrachloride with 17.5 grams (0.11 mol) of bromine. After removal of the solvent by distillation, petroleum ether was added and the mixture was distilled to remove azeotropically any adhering residues of carbon tetrachloride. After having repeated this distillation several times, the oily residue was dissolved in 30 cc. of petroleum ether and allowed to crystallize out at −10° C. This resulted in 27.6 grams of white crystals which, after renewed recrystallization from petroleum ether, had a melting point of 90–92° C.

[Formula: $C_9H_5OF_2Cl_4Br$. Molecualr weight 388.88]

|    | Calculated, percent | Found, percent |
|----|---------------------|----------------|
| Br | 20.56               | 20.41          |

19.5 grams (0.05 mol) of the 1-bromo-10,10-difluoro-4,5,6,7 - tetrachloro-4,7-endomethylene-4,7,8,9 - tetrahydrophthalane obtained were dissolved in 150 cc. of gasoline and reacted with 12.0 grams of anhydrous mercury-(II)-fluoride while vigorously stirring. The reaction mixture was maintained boiling for 10 hours with reflux, cooled and filtered. After complete removal of the gasoline the 1,10,10-trifluoro-4,5,6,7-tetrachloro-4,7-methylene-4,7,8,9-tetrahydrophthalane left as the residue was dissolved in 100 cc. of carbon tetrachloride and treated with 1.3 liters of chlorine while irradiating with ultraviolet light. Upon removal of the carbon tetrachloride by distillation and recrystallization of the oily residue from petroleum ether with the addition of active charcoal, 14.5 grams of 1,10,10-trifluoro-3,4,5,6,7-pentachloro-4,7-methylene-4,7,8,9-tetrahydrophthalane melting at 54–56° C. were obtained.

[Formula: $C_9H_4OF_3Cl_5$. Molecular weight: 362.42]

|    | Calculated, percent | Found, percent |
|----|---------------------|----------------|
| C  | 29.83               | 30.05          |
| H  | 1.11                | 1.34           |
| F  | 15.73               | 15.88          |
| Cl | 48.92               | 48.98          |

EXAMPLE 16

Tetrafluorodichloro-cyclopentadiene was reacted with 2.5-dihydrofurane without fractional distillation. The reaction was effected in the manner described in Example 10 by heating 21 grams of tetrafluoro-dichlorocyclopentadiene with 15 grams of 2.5-dihydrofurane for 16 hours at 120–125° C. in a bomb tube. The resulting brown-colored reaction product was fractionated under vacuum. This resulted in 14.6 grams of a slightly yellowish liquid which boiled between 90 and 110° C. under a pressure of 1 mm. Hg and the halogen content of which corresponded to the 4,5,10,10-tetrafluoro-6,7-dichloro-4,7-methylene-4,7,8,9-tetrahydrophthalane.

A portion of 13.8 grams of this distillate was treated with 2.3 liters of chlorine gas, in the manner used for similar reactions in our copending application Ser. No. 511,776. After removal of the solvent, 17.2 grams of a light, viscous residue were obtained as the reaction product.

Vacuum distillation of the chlorination mixture resulted in a main fraction boiling at 98–109° C. under a pressure of 0.1 mm. Hg and consisting of 4,5,10,10-tetrafluoro-1,3,6,7-tetrachloro-4,7-methylene - 4,7,8,9-tetrahydrophthalane.

[Formula: $C_9H_4OF_4Cl_4$. Molecular weight: 345.96]

|    | Calculated, percent | Found, percent |
|----|---------------------|----------------|
| F  | 21.97               | 21.60          |
| Cl | 41.00               | 40.49          |

EXAMPLE 17.—DUSTING AGENT

Part of the chlorination mixture prepared according to Example 10 was very finely ground with 197 parts of talc with the addition of a mixture of 1 part of heavy benzene and 1 part of fat alcohol-ethylene oxide condensation product.

EXAMPLE 18.—EMULSION

Dissolution of 20 parts of the chlorination mixture prepared according to Example 10 and 5 parts of fat alcohol-ethylene oxide condensation product (Emulsifier G 2081 of Chemische Fabrik Goldschmidt, Essen) in 75 parts of xylene resulted in a concentrate which, prior to use, must be stirred up with 2000–5000 parts of water to form an emulsion.

EXAMPLE 19.—SUSPENSION 40 parts of the chlorination mixture prepared according to Example 10 were extremely finely ground with 10 parts of Emulsifier GA 6590 (Goldschmidt) and 50 parts of kaolin. Prior to use, 1 part of this mixture was stirred up in 5000 parts of water.

EXAMPLE 20.—SPRAY

One part of the chlorination mixture prepared according to Example 10 was dissolved in 99 parts of kerosene.

The Examples 5 to 9 and 17 to 20 are given to illustrate the formation of dusting agents, emulsions, suspensions and sprays, respectively, from the fluorinated compounds in accordance with the invention. In these examples, which are given by way of illustration and not limitation, all the parts designated are parts by weight. These examples, however, by no means include all of the possible applications and combinations of the mixture of compounds according to the invention but are only to be regarded as specific examples.

The insecticidal properties of the new compounds were proved in tests using 20 four-day-old house flies (*Musca domestica*) in each test. Only females were used, because the same are more resistant than the males. The test flies were caught from their cages in a round-bottomed flask, and, after slight narcosis with gaseous carbon dioxide, the females were picked out, 20 females each were transferred into a test tube, which consisted of cylindrical glass tube of 73 sq. cm. inner surface. The insecticidal substances, diluted with petroleum ether, were applied in different concentrations to the inner surface of these tubes and the quantity applied was converted into $\gamma$/sq. cm. After a residence time of 30 minutes, the flies were transferred into recovery cages provided with water and sugar. All of the manipulations were carried out at a room temperature of $20\pm1°$ C. and a relative humidity of the air of 60–75%.

The flies were watched, and after 60, 90, 120, 150, and 180 minutes, the number of flies in irreversible upside-down position was related to the total number of flies used. To exclude small differences in sensitivity among the flies, the average values of ten successive tests were calculated.

Mixtures of 1-fluoro-3,4,5,6,7,10,10-heptachloro-4,7-methylene-4,7,8,9-tetrahydrophthalane, and 1,3-difluoro-4,5,6,7,10,10 - hexachloro - 4,7 - methylene-4,7,8,9-tetrahydrophthalane, i.e. mixtures of these $\alpha$ and $\alpha,\alpha'$-fluorinated ethers have been found to constitute extremely active insecticides having a high initial effect. Insecticides with these fluoro compounds as the active ingredients have proven much more effective than the known Diels-Alder addition compounds of hexachlorocyclopentadiene and unsaturated compounds, as such, or after further chemical conversion, as, for example, chlorination. Thus, for example, insecticides containing the fluoro derivatives in accordance with the invention, show a much higher initial effect and over-all effect than the known Diels-Alder addition compounds, as, for example, Chlordane, Aldrine, or Dieldrine. Chlordane is a chlorination product of the Diels-Alder addition compounds of hexachlorocyclopentadiene and cyclopentadiene, Aldrine is the addition compound of hexachlorocyclopentadiene and bicycloheptadiene, while Dieldrine is the epoxy compound of Aldrine.

By admixture with other insecticidally active compounds, the insecticidal properties of compounds in accordance with the invention may be increased by a synergistic effect. The extremely high initial effect of the new fluorinated ethers in accordance with the invention may be considerably increased or maintained when applied to resistant strains by adding small amounts, as for example, 1–5% by weight of pyrethrum extracts, allethrine, piperonyl butoxide, and others.

The initial effect of an insecticide is understood to be the dependence on time of the killing effect for an organism under standard conditions. The determination of this quality is carried out with twenty-four-day-old house flies (*Musca domestica L.*). The flies having been treated in the manner described above are watched, and after 60, 90, 120, 150 and 180 minutes, the number of flies in irreversible upside-down position is related to the total number of flies used. To exclude small differences in sensitivity among the flies, the average values of ten successive tests are calculated.

In the following Table 1, the effect, as dependent upon time and concentration applied, of a mixture of active substances prepared according to the invention (see Example 4), and consisting of 60% 1-fluoro-3,4,5,6,7,10,10-heptachloro-4,7-methylene - 4,7,8,9 - tetrahydrophthalane and 35% 1,3-difluoro-4,5,6,7,10,10-hexachloro-4,7-methylene-4,7,8,9-tetrahydrophthalane is compared with already known insecticides, i.e. the 100% active substances Chlordane, Aldrine, Dieldrine, and 1,3,4,5,6,7,10,10-octachloro-4,7-methylene-4,7,8,9-tetrahydrophthalane.

The superior initial effect of the new fluorine and chlorine-containing mixture of active substances as compared with known hexachloro-cyclopentadiene-based insecticidal active substances is clearly to be seen from the data listed in the following Table 1. While a maximum mortality of 10% is reached within a period of 60 minutes with the active substance Chlordane applied in a quantity of 6.85$\gamma$/sq. cm., a 100% killing effect can be observed for the $\alpha$-fluorinated ether mixture of the invention within the same time including the 30 minutes induction period.

As compared with the active substance 1,3,4,5,6,7,10,10-octachloro-4,7-methylene-4,7,8,9-tetrahydrophthalane, the $\alpha$-fluorinated ether mixture shows a substantially better initial effect not only against flies but also against a number of other organisms.

TABLE 1

| Active Substances | Quantity applied, $\gamma$/sq. cm. | Irreversibly damaged insects in percent of insects used, after a time of exposure of minutes | | | | |
|---|---|---|---|---|---|---|
| | | 60 | 90 | 120 | 150 | 180 |
| 1,2,4,5,6,7,8,8-octachloro-4,7-methane-3a,4,7,7a-tetrahydroindene (Chlordane). | 6.85 | 10 | 10 | 10 | 12 | 18 |
| | 1.37 | 7 | 7 | 7 | 8 | 8 |
| | 0.685 | 3 | 4 | 5 | 6 | 7 |
| 1,2,3,4,10,10-hexachloro-1,4,4a,5,8,8a - hexahydro - 1,4,5,8-dimethanonaphthalene (Aldrine). | 6.85 | 5 | 18 | 20 | 27 | 33 |
| | 1.37 | 5 | 17 | 18 | 25 | 29 |
| | 0.685 | 4 | 10 | 15 | 20 | 25 |
| 1,2,3,4,10,0 -hexachloro-6,7-epoxy-1,4,4a,5,6,7,8,8a-octahydro-1,4,5,8-dimethanonaphthalene (Dieldrine). | 6.85 | 2 | 3 | 5 | 5 | 5 |
| | 1.37 | 2 | 2 | 4 | 4 | 4 |
| | 0.685 | 2 | 2 | 3 | 3 | 3 |
| 1,3,4,5,6,7,10,10 - octachloro - 4,7 - methylene - 4,7,8,9 - tetrahydrophthalane. | 6.85 | 61 | 72 | 87 | 89 | 90 |
| | 1.37 | 48 | 67 | 80 | 81 | 81 |
| | 0.685 | 37 | 46 | 52 | 55 | 58 |
| Mixture of active substances according to the invention, prepared according to Example 4 consisting of 1-fluoroheptachloro-and 1.3 - difluoro - hexachloro - compound. | 6.85 | 100 | 100 | 100 | 100 | 100 |
| | 1.37 | 90 | 96 | 100 | 100 | 100 |
| | 0.685 | 73 | 86 | 95 | 100 | 100 |

The superior initial effect of the new fluorine and chlorine-containing active substances as compared with Aldrine, Dieldrine or Chlordane is clearly to be seen. This success was obtainable not only with flies, but also with *Calandra granaria*, *Calandra oryzae* and with noxious insects.

The activity towards resistant fly strains was determined as follows:

The flies were treated with the same insecticidal substance using a dose at which only 10% of the females survived. These animals were used for breeding a new generation of flies. This generation was subjected to the same treatment. In this manner, the 9th to 16th generations were bred. These resistant generations were tested with the same insecticidal substance by the method of Hoskins and Messengers.

In comparing the activity towards normal susceptible and resistant strains of *Musca domestica L.* the values listed in the following Table 2 were obtained.

TABLE 2.—INSECTICIDAL ACTIVITIES

| Active Substances | Quantity applied, γ/sq. cm. | No. | Irreversibly damaged insects in percent of insects used after an exposure-time of minutes | | | | |
|---|---|---|---|---|---|---|---|
| | | | 60 | 90 | 120 | 150 | 180 |
| octachloro-compound Ser. No. 511,776 | | | Normal Susceptible Strain | | | | |
| | 6.85 | 1 | 61 | 72 | 87 | 89 | 90 |
| | 1.37 | 2 | 48 | 67 | 80 | 81 | 81 |
| | 0.685 | 3 | 37 | 46 | 52 | 55 | 58 |
| | | | Resistant Strain | | | | |
| | 6.85 | 4 | 5 | 5 | 5 | 5 | 5 |
| | 1.37 | 5 | 3 | 3 | 3 | 3 | 3 |
| | 0.685 | 6 | 0 | 0 | 0 | 0 | 0 |
| 1-fluoro-heptachloro-compound of invention | | | Normal Susceptible Strain | | | | |
| | 6.85 | 7 | 65 | 72 | 77 | 80 | 82 |
| | 1.37 | 8 | 53 | 60 | 65 | 71 | 75 |
| | 0.685 | 9 | 50 | 53 | 55 | 65 | 72 |
| | | | Resistant Strain | | | | |
| | 6.85 | 10 | 60 | 70 | 72 | 75 | 75 |
| | 1.37 | 11 | 55 | 58 | 59 | 63 | 69 |
| | 0.685 | 12 | 50 | 50 | 51 | 53 | 69 |
| 1,3-difluoro-hexachloro-compound of invention | | | Normal Susceptible Strain | | | | |
| | 6.85 | 13 | 68 | 70 | 73 | 75 | 77 |
| | 1.37 | 14 | 48 | 57 | 63 | 67 | 70 |
| | 0.685 | 15 | 55 | 60 | 63 | 66 | 68 |
| | | | Resistant Strain | | | | |
| | 6.85 | 16 | 49 | 57 | 61 | 62 | 68 |
| | 1.37 | 17 | 45 | 55 | 56 | 59 | 59 |
| | 0.685 | 18 | 38 | 44 | 49 | 52 | 58 |
| Mixture of 1-fluoro-heptachloro-compound and 1,3-difluoro-hexachloro-compound of invention | | | Normal Susceptible Strain | | | | |
| | 6.85 | 19 | 100 | 100 | 100 | 100 | 100 |
| | 1.37 | 20 | 90 | 96 | 100 | 100 | 100 |
| | 0.685 | 21 | 73 | 86 | 95 | 100 | 100 |
| | | | Resistant Strain | | | | |
| | 6.85 | 22 | 100 | 100 | 100 | 100 | 100 |
| | 1.37 | 23 | 92 | 93 | 93 | 95 | 95 |
| | 0.685 | 24 | 75 | 79 | 85 | 88 | 92 |
| 10,10-difluoro-hexachloro-compound of invention | | | Normal Susceptible Strain | | | | |
| | 6.85 | 25 | 98 | 99 | 100 | 100 | 100 |
| | 1.37 | 26 | 93 | 96 | 100 | 100 | 100 |
| | 0.685 | 27 | 87 | 90 | 92 | 95 | 98 |
| | | | Resistant Strain | | | | |
| | 6.85 | 28 | 90 | 92 | 100 | 100 | 100 |
| | 1.37 | 29 | 86 | 91 | 95 | 95 | 98 |
| | 0.685 | 30 | 80 | 81 | 88 | 88 | 91 |
| 1,10,10-trifluoro-pentachloro-compound of invention | | | Normal Susceptible Strain | | | | |
| | 6.85 | 31 | 100 | 100 | 100 | 100 | 100 |
| | 1.37 | 32 | 92 | 93 | 95 | 97 | 97 |
| | 0.685 | 33 | 57 | 63 | 67 | 68 | 68 |
| | | | Resistant Strain | | | | |
| | 6.85 | 34 | 100 | 100 | 100 | 100 | 100 |
| | 1.37 | 35 | 90 | 90 | 90 | 92 | 93 |
| | 0.685 | 36 | 51 | 58 | 58 | 61 | 63 |

TABLE 2.—INSECTICIDAL ACTIVITIES

| Active Substances | Quantity applied, γ/sq. cm. | No. | Irreversibly damaged insects in percent of insects used after an exposure-time of minutes | | | | |
|---|---|---|---|---|---|---|---|
| | | | 60 | 90 | 120 | 150 | 180 |
| 1.3.10.10-tetrafluoro-tetrachloro-compound of invention | Normal Susceptible Strain | | | | | | |
| | 6.85 | 37 | 42 | 47 | 50 | 54 | 57 |
| | 1.37 | 38 | 48 | 47 | 46 | 48 | 50 |
| | 0.685 | 39 | 16 | 23 | 27 | 27 | 27 |
| | Resistant Strain | | | | | | |
| | 6.85 | 40 | 8 | 11 | 15 | 21 | 25 |
| | 1.37 | 41 | 9 | 13 | 13 | 13 | 17 |
| | 0.685 | 42 | 4 | 8 | 12 | 14 | 14 |
| Mixture of 1.10.10-trifluoro-pentachloro-compound and 1.3.10.10-tetrafluoro-tetrachloro-compound of invention | Normal Susceptible Strain | | | | | | |
| | 6.85 | 43 | 100 | 100 | 100 | 100 | 100 |
| | 1.37 | 44 | 63 | 63 | 63 | 64 | 65 |
| | 0.685 | 45 | 22 | 27 | 30 | 33 | 35 |
| | Resistant Strain | | | | | | |
| | 6.85 | 46 | 89 | 89 | 92 | 96 | 100 |
| | 1.37 | 47 | 65 | 65 | 62 | 61 | 61 |
| | 0.685 | 48 | 28 | 29 | 29 | 32 | 33 |
| 4.5.10.10-tetrafluoro-tetrachloro-compound of invention | Normal Susceptible Strain | | | | | | |
| | 6.85 | 49 | 62 | 65 | 69 | 73 | 74 |
| | 1.37 | 50 | 33 | 35 | 37 | 37 | 43 |
| | 0.685 | 51 | 20 | 23 | 25 | 27 | 27 |
| | Resistant Strain | | | | | | |
| | 6.85 | 52 | 55 | 56 | 59 | 64 | 66 |
| | 1.37 | 53 | 41 | 42 | 44 | 44 | 44 |
| | 0.685 | 54 | 23 | 23 | 25 | 28 | 29 |

As may be seen from lines 4 to 6, the octachloro-compound according to Serial No. 511,776 has only a very low and practically no longer utilizable activity towards resistant strains of Musca domestica. These activity figures are below 10% and partially even far below 10% of those values which are obtained with the octachloro-compound on normal susceptible animals (lines 1–3).

The 1-fluoro-heptachloro compound and the 1.3-difluoro-hexachloro compound have practically the same activity towards normal strains (lines 7–9 and 13–15) as the octachloro-compound. There is even a somewhat better initial effect to be observed with an exposure period of 60 minutes. It was completely surprising, however, that these fluorine and chlorine containing compounds exhibit only a slight decrease in activity in the treatment of resistant strains (lines 10–12 and 16–18). In general, an activity being still in excess of 90% and, in infavorable cases, being still 70% is obtained with these compounds as compared with the control of non-resistant strains. These values are far in excess of that activity which is exerted by the octachloro compound (Serial No. 511,776) on resistant strains.

A definitely better activity than that of the octachloro-compound towards normal fly strains is exhibited by the mixture of the 1-fluoro-heptachloro compound and the 1.3-difluoro-hexachloro compound (lines 19–24), the 10.10-difluoro-hexachloro compound (lines 25–30) and the 1.10.10-trifluoro-pentachloro compound (lines 31–36). Moreover, remarkable is the fact that the activity of these compounds in controlling resistant strains (lines 22–24 and 28–30 and 34–36) shows only little decrease. In these cases, an activity towards resistant strains can always be expected, which is still about 90%. As compared with the very poor activity of the octachloro compound (lines 4–6) towards resistant strains, this fact is extremely surprising. In view of the normally very high activity of the octachloro-compound, so largely improved effects on resistant strains could not be expected by any person in the art.

Also remarkable is the activity of mixtures of the 1.10.10 - trifluoro - pentachloro compound and the 1.3.10.10-tetrafluoro-tetrachloro compound (lines 43–48). With high quantities applied (6.85γ/sq. cm.), they are more efficient than the octachloro compound in the same quantity applied (line 1). With resistant strains (lines 46–48), activities which almost reach the values achieved on normal strains are obtained (see lines 44–45 and 47–48). In the most infavorable case, the activity towards resistant strains is still 90% of the effect obtained on normal strains. In any case, the activity of these chlorine and fluorine containing compounds towards resistant strains is substantially higher than the effect exerted by the octachloro compound on resistant strains (lines 4–6 and 46–48).

The 4.5.10.10-tetrafluoro-tetrachloro compound (lines 49–54) also is of outstanding activity. With normal strains, the activity of the octachloro compound is almost approached (lines 49–51 and 1–3, respectively). In controlling resistant strains, there is observed only a slight decrease and an effect which is by a power of ten better than that exerted by the octachloro compound on resistant animals (see lines 52–54 and 4–6, respectively).

The 1.3.10.10-tetrafluoro-tetrachloro compound which, in mixture with the 1.10.10-trifluoro-pentachloro compound, is of extremely good efficiency towards both normal and resistant strains, has an effect when used alone which is exceeded by that of the octachloro compound on normal susceptible strains (see lines 37–39 and 1–3, respectively). Despite this fact, there exists also in this case a remarkable insecticidal activity which can be absolutely compared with that of the other chlorine containing insecticides.

In controlling resistant strains, however, the 1.3.10.10-tetrafluoro-tetrachloro compound also shows no decrease in activity as being unfortunately the case with the octachloro compound (see lines 40–42 and 4–6, respectively). Even in this case, there is still obtained an activity which is as much as five times higher than that obtainable with the octachloro compound towards resistant strains.

The values listed in Table 2 indicate that the fluorine and chlorine containing endomethylene-tetrahydrophthalane compounds in accordance with the invention represent an extremely great advance in the insecticide field, which advance could by no means be foreseen by the skilled artisan. The new compounds have the advantage that practically the same effects as on normal insect strains can be obtained in controlling resistant insect strains.

We claim:

1. An octahalogen-4.7-methylene - tetrahydrophthalane of the formula:

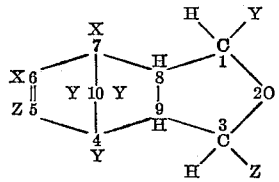

in which X represents chlorine, at least one of the Y's and Z's represents fluorine, each of the other Y's and Z's is a member selected from the group consisting of chlorine and fluorine, said compound containing from one to four fluorine atoms and from four to seven chlorine atoms, and always containing identical substituents at the 10 position and at positions 4 and 5.

2. 10,10-difluoro-1,3,4,5,6,7- - hexachloro - 4,7-methylene-4,7,8,9-tetrahydrophthalane.

3. 4,5,10,10 - tetrafluoro-1,3,6,7-tetrachloro-4,7-methylene-4,7,8,9-tetrahydrophthalane.

4. 1-fluoro-3,4,5,6,7,10,10 - heptachloro - 4,7-methylene-4,7,8,9-tetrahydrophthalane.

5. 1,3 - difluoro-4,5,6,7,10,10 - hexachloro-4,7-methylene-4,7,8,9-tetrahydrophthalane.

6. 1,10,10 - trifluoro - 3,4,5,6,7-pentachloro-4,7-methylene-4,7,8,9-tetrahydrophthalane.

7. 1,3,10,10 - tetrafluoro - 4,5,6,7-tetrachloro-4,7-methylene-4,7,8,9-tetrahydrophthalane.

8. A process for the production of a 1,3,4,5,6,7,10,10-octahalogen-endomethylene-tetrahydrophthalane, containing from 1 to 4 fluorine atoms, at least one of said fluorine atoms being in the 1 position and the remaining fluorine atoms being at positions 3, 10,10, and the remaining halogen atoms being chlorine atoms, which comprises heating at a temperature of between 50° and 150° C. a 1,3-dichloro-4,5,6,7,10,10-hexahalogen-4,7-methylene-4,7,8,9-tetrahydrophthalane in which each of the halogen atoms in the 6 and 7 positions is chlorine and each of the halogen atoms in the 4 and 5 positions is a member selected from the group consisting of chlorine and fluorine, with liquid hydrogen fluoride and recovering the reaction product formed.

9. A process for the preparation of a 1.3.4.5.6.7.10.10-octahalogen - 4.7 - methylene - 4.7.8.9-tetrahydrophthalanes which contain from two to four fluorine atoms in the 4.5.10.10-positions, said fluorine atoms being attached in the order 10.10.4.5-positions, the remaining positions unoccupied by fluorine atoms being occupied by chlorine atoms, which comprises chlorinating a member of the group consisting of 10.10-difluoro-4.5.6.7-tetrachloro-4.7-methylene - 4.7.8.9 - tetrahydrophthalane and 4.5.10.10-tetrafluoro, 6.7-dichloro-4.7-methylene-4.7.8.9-tetrahydrophthalene, with a chlorinating agent until two gram-atoms of chlorine per molecule are taken up.

10. A process for the production of a 1-fluoro-3-chloro - 4.5.6.7.10.10 - hexahalogen - 4.7 - methylene-4.7.8.9-tetrahydrophthalane wherein each of the halogen atoms is a member selected from the group consisting of chlorine and fluorine atoms, which comprises brominating a 4.5.6.7.10.10 - hexahalogen - 4.7 - methylene - 4.7.8.9-tetrahydrophthalane selected from the group consisting of 4,5,6,7,10,10-hexachloro-4,7-methylene-4,7,8,9-tetrahydrophthalane and 10,10-difluoro-4,5,6,7-tetrachloro-4,7-methylene-4,7,8,9-tetrahydrophthalane with a brominating agent, reacting the resultant 1-bromo-4,5,6,7,10,10-hexahalogen-4,7-methylene-4,7,8,9 - tetrahydrophthalane with a heavy metal fluoride to form 1-fluoro-4,5,6,7,10,10-hexahalogen-4,7-methylene-4,7,8,9 - tetrahydrophthalane, and converting the latter into 1-fluoro-3-chloro-4,5,6,7,10,10-hexahalogen - 4,7 - methylene - 4,7,8,9-tetrahydrophthalane by means of a conventional chlorinating agent.

11. A method for controlling insect pests which comprises applying a compound of the formula:

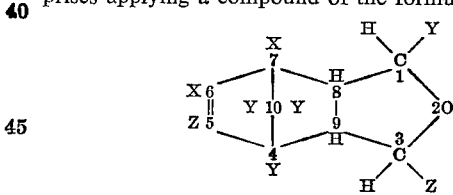

in which X represents chlorine, at least one of the Y's and Z's represents fluorine, each of the other Y's and Z's is a member selected from the group consisting of chlorine and fluorine atoms, the number of fluorine atoms being from one to four, and the number of chlorine atoms being from four to seven, and always containing identical substituents at position 10 and at the positions 4 and 5, to at least one of the insects in its habitat.

No references cited.